United States Patent [11] 3,609,184

[72] Inventors Nobuyoshi Miyai
Takarazuka-shi;
Kei Takahashi, Takarazuka-shi; Hisao Yamamoto, Nishinomiya-shi, all of Japan
[21] Appl. No. 758,697
[22] Filed Sept. 10, 1968
[45] Patented Sept. 28, 1971
[73] Assignee Sumitomo Chemical Co., Ltd.
Osaka-shi, Osaka-fu, Japan
[32] Priority Sept. 11, 1967
[33] Japan
[31] 42/58538

[54] 1-SUBSTITUTED-3-INDENYLACETIC ACID AND ESTERS
3 Claims, No Drawings
[52] U.S. Cl.................................................. 260/520,
260/470, 260/473, 260/516, 424/317
[51] Int. Cl........................................................C07c 65/14,
C07c 69/76
[50] Field of Search.............................................. 260/515,
469, 516, 470, 520, 473

[56] References Cited
UNITED STATES PATENTS
3,312,730 4/1967 Winter .......................... 260/473
3,274,240 9/1968 Fritz............................... 260/515
3,312,730 4/1967 Winter .......................... 260/473

Primary Examiner—Charles B. Parker
Assistant Examiner—Edward Jay Gleiman
Attorneys—Harry C. Bierman, Jordan B. Bierman and Bierman & Bierman ABSTRACT: Indene derivatives of the formula:

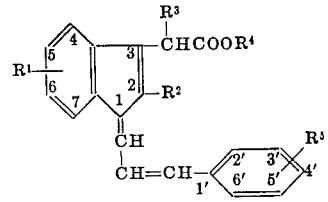

wherein $R^1$ is hydrogen, halogen, lower alkyl, lower alkoxy or lower alkylthio, $R^2$ is hydrogen or lower alkyl, $R^3$ is hydrogen, lower alkyl or phenyl, $R^4$ is hydrogen, lower alkyl or phenyl (lower) alkyl and $R^5$ is hydrogen, halogen, lower alkyl or lower alkoxy. The compounds are useful as antiinflammatory agents.

1-SUBSTITUTED-3-INDENYLACETIC ACID AND ESTERS

The present invention relates to indene derivatives and production thereof. More particularly, it relates to novel 1-substituted 3-indenylacetic acids and their esters having the formula:

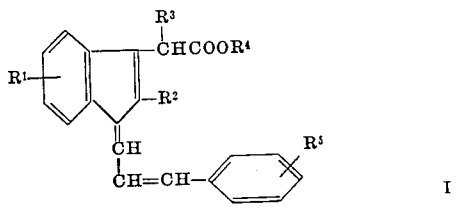

wherein $R^1$ is either a hydrogen atom, a halogen atom (e.g. chlorine, bromine, fluorine), an alkyl group (e.g. methyl, ethyl, propyl, isopropyl, butyl), an alkoxy group, (e.g. methoxy, propoxy, isopropoxy, butoxy) or an alkylthio group (e.g. methylthio, ethylthio, propylthio); $R^2$ is either a hydrogen atom or an alkyl group (e.g. methyl, ethyl, propyl, isopropyl, butyl); $R^3$ is either a hydrogen atom, an alkyl group (e.g. methyl, ethyl, propyl, isopropyl, butyl) or a phenyl group; $R^4$ is either a hydrogen atom, an alkyl group (e.g. methyl, ethyl, propyl, isopropyl, butyl) or a phenylalkyl group (e.g. benzyl, phenethyl); $R^5$ is either a hydrogen atom, a halogen atom (e.g. chlorine, bromine, fluorine), an alkyl group (e.g. methyl, ethyl, propyl, isopropyl, butyl) or an alkoxy group (e.g. methoxy, ethoxy, propoxy, isopropoxy, butoxy). The present invention further relates to the production of the described acids and their esters.

In this specification, the term "alkyl" is intended to mean lower alkyl, preferably having not more than 5 carbon atoms. Further, the symbols $R^1$ and $R^5$ may be located, respectively, at either one of the 4 to 7-positions of the indene nucleus and at either one of the 2' to 6'-positions of the benzene ring.

A basic object of the present invention is to embody the 1-substituted 3-indenylacetic acids and their esters [I]. Another object of this invention is to embody the 1-substituted 3-indenylacetic acids and their [I] having pharmacological activity. A further object of the invention is to embody a process for preparing the 1-substituted 3-indenylacetic acids and their esters [I]. These and other objects will be apparent from the subsequent description to those conversant with the art to which the present invention pertains.

The 1-substituted 3-indenylacetic acids and their esters [I] can be prepared from the corresponding esters of 1-unsubstituted 3-indenylacetic acids according to the following scheme:

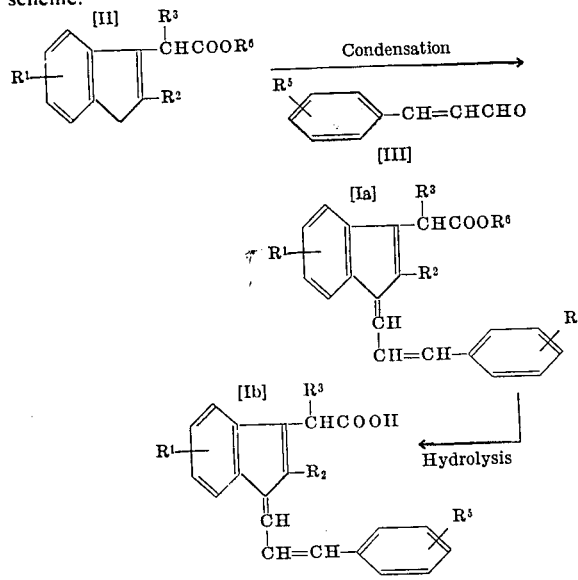

wherein $R^6$ is an alkyl group (e.g. methyl, ethyl, propyl, isopropyl, butyl) or a phenylalkyl group (e.g. benzyl, phenethyl) and $R^1, 2, 3, R^5$ are each as defined above.

The preparation of the starting esters of 1-unsubstituted 3-indenylacetic acids [II] was reported in the abstract of the 152nd Meeting of the American Chemical Society (1966).

According to the present invention, the starting ester of 1-unsubstituted 3-indenylacetic acid [II] is condensed with the cinnamaldehyde compound [III], generally in the presence of a condensing agent such as, for example, alkali metal hydride (e.g. sodium hydride, lithium hydride), alkali metal amide (e.g. potassium amide, sodium amide, lithium amide) or an organic metal compound (e.g. phenyl lithium, butyl lithium, trityl lithium, trityl potassium) in an inert solvent. Inert solvents which may be employed include, for example, ether, benzene, petroleum ether or diglyme. The condensation can take place at an ambient temperature or while cooling or heating. The subsequent hydrolysis of the resultant ester of 1-substituted 3-indenylacetic acid [Ia] to the corresponding 1-substituted 3-indenylacetic acid [Ib] is effected by the treatment of the former with water, usually in the presence of an acid (e.g. hydrochloric acid, sulfuric acid, nitric acid). The hydrolysis can take place at an ambient temperature or while cooling or heating.

The 1-substituted 3-indenylacetic acids and their esters [I], prepared in the manner described above, have useful pharmacological activity. For instance, 1-cinnamylidene-2-methyl-5-methoxy-3-indenylacetic acid produces 40 percent and 50 percent inhibition of carrageenin-induced edema in a rat's hind paw by an oral administration of the respective doses of 20 mg./kg. and 50 mg./kg. It is particularly notable that the said compound does not induce any occult blood in feces or other toxic syndromes even when orally administered in such large doses as 1000 mg./kg. Other 1-substituted 3-indenylacetic acids and their esters such as 1-cinnamylidene-2-methyl-5-chloro-3-indenylacetic acid and 1-cinnamylidene-2, 5-dimethyl-3-indenylacetic acid exhibit similar activity. They are therefore useful as anti-inflammatory agents.

A practical and presently preferred embodiment of this invention is illustratively shown in the following Example.

Example

Into liquid ammonia (20 ml.) cooled with dry ice and acetone, a trace amount of ferric nitrate was added, and metallic potassium (0.8 g.) was portionwise added thereto. After the addition of diglyme (20 ml.), the resultant mixture was stirred at room temperature until ammonia was removed. To the resulting diglyme solution of potassium amide kept below 10° C. in a nitrogen stream, a solution of ethyl 2-methyl-5-methoxy-3-indenylacetate (5 g.) in diglyme was dropwise added while stirring. Then, cinnamaldehyde (2.7 g.) was added thereto, and the resultant mixture was stirred at room temperature for 24 hours. The reaction mixture containing ethyl 1-cinnamylidene-2-methyl-5-methoxy-3-indenylacetate was poured onto a mixture of ice and water, made acidic with dilute sulfuric acid and extracted with ether. The ethereal extract was chromatographed on silica gel and eluted with benzene. Purification gave yellow crystals of 1-cinnamylidene-2-methyl-5-methoxy-3-indenylacetic acid. M.P. 214° to 216° C.

In the similar manner, there are produced the following compounds: 1-cinnamylidene-3-indenylacetic acid, 1-cinnamylidene-4, 5, 6 or 7-halo-3-indenylacetic acids, 1-cinnamylidene-4, 5, 6 or 7-lower alkyl-3-indenylacetic acids, 1-cinnamylidene-4, 5, 6, or 7-lower alkoxy-3-indenylacetic acids, 1-cinnamylidene-4, 5, 6 or 7-lower alkylthio-3-indenylacetic acids, 1-cinnamylidene-2lower alkyl-3-indenylacetic acids, 1-cinnamylidene-2-lower alkyl-4, 5, 6 or 7-halo-3-indenylacetic acids, 1-cinnamylidene-2-lower alkyl-4, 5, 6 or 7-lower alkyl-3-indenylacetic acids, 1-cinnamylidene-2-lower alkyl-4, 5, 6 or 7-lower alkoxy-3-indenylacetic acids, 1-cinnamylidene-2-lower alkylthio-3-indenylacetic acids, etc.

what is claimed is

1. A compound of the formula:

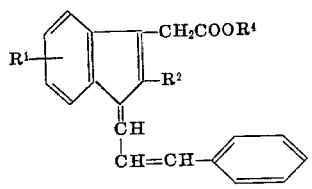

Wherein $R^1$ is hydrogen, halogen, lower alkyl, lower alkoxy or lower alkylthio, $R^2$ is hydrogen or lower alkyl and $R^4$ is hydrogen, phenyl (lower alkyl) or lower alkyl.

2. The compound according to claim 1 which is 1-cinnamylidene-2-lower alkyl-5-lower alkoxy-3-indenylacetic acid.

3. The compound according to claim 2 which is 1-cinnamylidene-2-methyl-5-methoxy-3-indenylacetic acid.